(12) United States Patent
McCabe

(10) Patent No.: US 7,267,530 B2
(45) Date of Patent: Sep. 11, 2007

(54) WINDMILL APPARATUSES AND METHODS OF MOUNTING BLADES TO ENHANCE THEIR PERFORMANCE

(76) Inventor: Francis J. McCabe, #6 Bunker Hill Rd., Ottville, PA (US) 18942

(*) Notice: Subject to any disclaimer, the term of this patent is extended or adjusted under 35 U.S.C. 154(b) by 87 days.

(21) Appl. No.: 10/783,800

(22) Filed: Feb. 21, 2004

(65) Prior Publication Data

US 2004/0206554 A1 Oct. 21, 2004

Related U.S. Application Data

(63) Continuation-in-part of application No. 10/026,334, filed on Dec. 21, 2001, now abandoned, which is a continuation-in-part of application No. 09/990,855, filed on Nov. 21, 2001, now abandoned.

(60) Provisional application No. 60/258,957, filed on Dec. 29, 2000, provisional application No. 60/252,772, filed on Nov. 22, 2000, provisional application No. 60/252,812, filed on Nov. 22, 2000.

(51) Int. Cl.
*F03D 11/04* (2006.01)
*B62D 57/00* (2006.01)

(52) U.S. Cl. .................. 416/196 A; 416/203; 180/7.4

(58) Field of Classification Search ................ 180/2.2, 180/7.4; 416/196 A, 203, 198 R, 237, 223 R
See application file for complete search history.

(56) References Cited

U.S. PATENT DOCUMENTS

| | | | | | |
|---|---|---|---|---|---|
| 244,971 | A | * | 8/1881 | Adams | 416/196 R |
| 1,015,505 | A | * | 1/1912 | Moon et al. | 416/164 |
| 1,142,502 | A | * | 6/1915 | Donnelly | 416/9 |
| 3,032,119 | A | * | 5/1962 | Hachmann | 416/200 R |
| 3,786,583 | A | * | 1/1974 | Revor | 40/479 |
| 3,918,839 | A | * | 11/1975 | Blackwell et al. | 416/175 |
| 3,920,354 | A | * | 11/1975 | Decker | 416/117 |
| 3,942,026 | A | * | 3/1976 | Carter | 290/55 |
| 4,065,225 | A | * | 12/1977 | Allison | 416/121 |
| 4,171,929 | A | * | 10/1979 | Allison | 416/226 |
| 4,377,373 | A | * | 3/1983 | Westerhausen | 416/197 A |
| 4,649,284 | A | * | 3/1987 | Hsech-Pen | 290/55 |
| 4,650,403 | A | * | 3/1987 | Takacs | 416/197 A |
| 4,877,374 | A | * | 10/1989 | Burkett | 416/136 |
| 6,132,181 | A | * | 10/2000 | McCabe | 417/334 |
| 6,497,593 | B1 | * | 12/2002 | Willis | 440/8 |
| 6,857,846 | B2 | * | 2/2005 | Miller | 415/4.2 |
| 7,044,713 | B2 | * | 5/2006 | Joo | 416/201 A |

* cited by examiner

*Primary Examiner*—Tony Winner

(57) ABSTRACT

A windmill apparatus has multiple pairs of blades to enhance power output and lift performance. The apparatus has multiple double acting piston/cylinders actuated by the windmill, which includes several clutches that are used to engage and disengage the windmill from the motor.

1 Claim, 17 Drawing Sheets

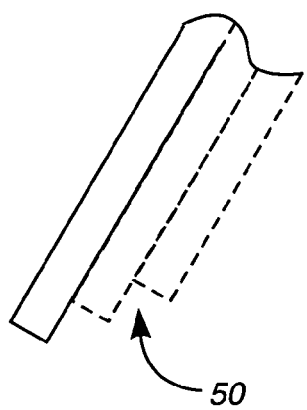
FIG. 9 VIEW A
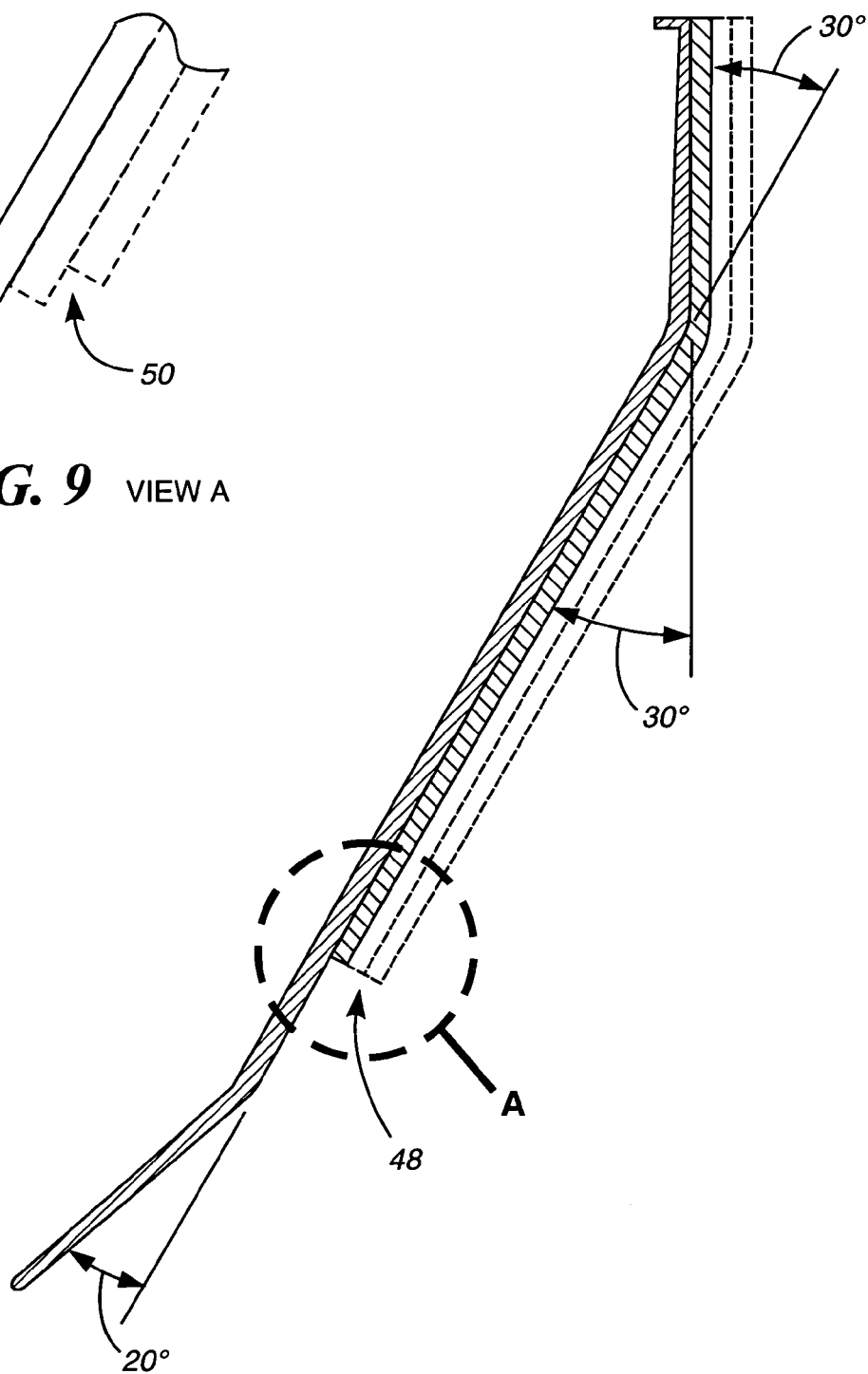
FIG. 8

| COMPARISON OF LIFT FORCE PER FOOT OF AIRFOIL (VANE) LENGTH VS. ANGLE OF ATTACK FOR THREE DIFFERENT AIRFOILS. | | | |
|---|---|---|---|
| ANGLE OF ATTACK | 7" CHORD McCABE AIRFOIL | 8 13/32" CHORD NACA-12 AIRFOIL | 9 1/2" - 7" CHORD McCABE BI-VANE AIRFOIL |
| 0° | 1.04# | - | 2.85# |
| 8° | - | - | 3.40# |
| 12° | 1.85# | 0.95# | 3.65# |
| 16° | - | - | 3.35# |
| 29° | 2.40# | 1.25# | 2.20# |

*FIG. 10*

WINDMILL APPARATUSES AND METHODS OF MOUNTING BLADES TO ENHANCE THEIR PERFORMANCE

CROSS-REFERENCE TO RELATED APPLICATIONS

This application is a Continuation-in-Part of my prior applications, namely AIR PROPULSION APPARATUS WITH WINDMILL HAVING MULTIPLE WINDMILL BLADES TO ENHANCE PERFORMANCE, Ser. No. 10/026,334, filed Dec. 21, 2001 now abandoned and the disclosures of the applications cross referenced therein, namely, AIR PROPULSION DEVICES, Ser. No. 60/258,957, filed Dec. 29, 2000; WINDMILL WITH MULTIPLE DOUBLE-ACTING PISTON/CYLINDER COMPRESSOR SYSTEM AND APPARATUS AND METHOD OF MOUNTING MULTIPLE WINDMILL BLADES TO ENHANCE PERFORMANCE, Ser. No. 09/990,855, filed Nov. 21, 2001 now abandoned; and includes the applications referenced therein, namely, WINDMILL WITH TWO PISTON COMPRESSOR SYSTEM, Ser. No. 60/252,772, filed Nov. 22, 2000; and APPARATUS AND METHOD OF MOUNTING MULTIPLE BLADES TO ENHANCE PERFORMANCE, Ser. No. 60/252,812, filed Nov. 22, 2000; the disclosures of all of which are incorporated herein by reference as if fully set forth.

BACKGROUND OF THE INVENTION

1. Technical Field

This invention relates to improvements in devices powered by air, and more particularly, to windmills and apparatuses connected to them, such as, vehicles propelled by motor driven propellers, augmented by a windmill; which apparatuses may additionally have multiple airfoils in a stack to enhance power output, lift and propulsion.

2. Background Art

In the prior art, it was known to use windmills to compress and store compressed air. Such a system is shown in my prior art U.S. Pat. No. 6,132,181, issued Oct. 17, 2000, which discloses windmill structures and systems. Therein I disclose a number of ways of attaching the rotating shaft of a windmill to various mechanical means and compressors.

In the prior art, it is known to use air to power vehicles such as automobiles. Despite extensive knowledge of the desirability of such vehicles, there is not currently on the market for mass production and delivery to the general public any such device. Guy Negre, a French engineer, allegedly has several patents and has produced a number of prototypes. Reportedly, air would be stored in a carbon-fiber or fiberglass tank at very high pressure (4,351 pounds per square inch), then combined with warmer outside air in a cylinder to move a piston. It may be that the car would actually scrub the ambient air with an onboard carbon filter.

It is reported that around 1900, compressed air trams plied the streets of Paris. Reportedly, the trams made only short trips. Attempts to run cars or trucks on compressed air have foundered on the weight of the air tanks needed to obtain a minimally acceptable range of 100 miles or more.

Engineers who have looked at hybrid-powered vehicles have felt that compressed air compared unfavorably with batteries as a medium for storing energy and were inherently inefficient. It is noteworthy that the environmentalists feel that the car, rather than being pollution-free, would only be as clean to the environment as the plants that produce the electricity used in compressing the air to drive the vehicles.

To that end, the proponents of compressed air vehicles state that environmentally complete clean hydro power or solar panels could be used to supply the electricity.

One of the problems that I have noted in my work with windmills is that there may be periods when the wind is either very slow or very fast for a sustained period of time. This can affect the usefulness of the windmill system in compressing and storing compressed air.

Further, in the prior art, it has been known to mount air foils in stacks, such as the wing arrangement in bi-planes and tri-planes. I have discovered that the performance of such arrangements may be enhanced depending on the mounting and relative positioning of the air foils.

DISCLOSURE OF THE INVENTION

Summary of the Invention

I have invented means and methods for enhancing the performance of windmills and the devices connected to them. By enhancing, I mean making that performance greater than it otherwise would have been but for my invention.

I disclose hereinafter performance results to illustrate this statement.

Examples include, without limitation, mounting multiple blades, interconnecting the blades and using multiple windmills, such as in vehicles.

More particularly, I have invented an aerodynamic air foil structure and method which is useful not only for wind design arrangements, but also for air foil blades in other devices, such as fans and windmills.

This is an improved airfoil arrangement which can provide airfoils in combination which provides needed structural strength while causing (windmill) lift; (propeller) thrust; (fan) flow enhancement which is greater than the sum of the individual air flows (in the same air flow conditions).

I have invented an air propelled vehicle with a windmill system which utilizes an improved airfoil arrangement comprising airfoils in combination which provide needed structural strength while causing windmill air flow enhancement which is greater than the sum of the individual air flows (under the same air flow conditions).

In a preferred embodiment, multiple pairs of blades are attached to multiple hubs on a windmill shaft. The blades in each pair of windmill blades are interconnected with braces.

My invention comprises, as well, an air propelled vehicle, comprising: an air propulsion means to propel said vehicle; said air propulsion means having a source of power, such as a motor, to drive the air propulsion means; a power transfer means, such as a shaft, engaging said source of power; and a first clutch means for engaging said power transfer means in a selected condition; a windmill means to provide enhanced propulsion to said vehicle when engaging said first clutch means in said selected condition. The vehicle described above further comprises a second clutch means coacting with said source of power to disengage said source of power from driving said propulsion means when said windmill means provides propulsion which exceeds that of the source of power. In one embodiment the air propulsion means comprises a propeller. In another embodiment, the air propulsion means comprises two propellers.

I have invented a windmill compressed air system which utilizes two double acting pistons and cylinders. These are most preferably of different volume, but have the same stroke length. They have pressure control valves to provide for alternative choices depending on wind availability. The larger diameter piston is used to quickly pump up the volume of the storage tank for the compressed air to a desired level. After that, the smaller diameter piston takes over.

The larger diameter piston cuts off at lower air speeds, so that at least some useful work can be gained from the windmill turning and driving the smaller diameter piston.

Further, the improved airfoil arrangement comprises airfoils in combination which provide needed structural strength while causing windmill air flow enhancement which is greater than the sum of the individual air flows (under the same air flow conditions).

I have invented a windmill compressor apparatus comprising:

windmill means mounted to a windmill shaft to rotate said shaft in response to air flow through said windmill means;

multiple double-acting piston/cylinder means each having a piston operating within a cylinder to compress air upon movement of the piston within the cylinder;

each of said cylinders having a piston shaft connected to said piston therein; said piston shaft extending from said cylinder;

drive means connecting said piston shafts to said windmill shaft to drive said piston shafts in response to rotation of said windmill shaft; and conduit means connected to the piston/cylinder means to permit the flow of air into said cylinders to receive compressed air from said cylinders.

I have further invented a windmill compressor apparatus in which I position the multiple double-acting piston/cylinder means such that the cylinders are radially space from one another.

Most preferably, the cylinders are of different diameters. Pressure relief valves are disposed in discharge lines exiting said cylinders of different diameters. The pressure relief valve for the cylinder with the largest diameter is set to be actuated at a pressure which is less than the pressure relief valve for the cylinder with the smaller diameter.

The drive means comprises a crank arm attached to the windmill shaft to rotate therewith; said crank arm having a portion thereof connected to the piston shafts to rotate said piston shafts, thereby withdrawing and inserting the shafts with respect to the cylinders to compress air. The crank arm has a portion thereof opposite to the end which is connected to the piston shafts, which portion acts as a counterbalance to the pistons.

The windmill compressor apparatus as defined above may further comprise multiple pairs of windmill blades. The multiple pairs of blades are attached to multiple plates on a hub on said windmill shaft.

The blades in each pair of windmill blades are interconnected with braces.

BRIEF DESCRIPTION OF DRAWINGS

FIG. 8 shows the details of a blade with stiffeners;

FIG. 9 shows an alternate detail of structural parts;

FIG. 10 shows comparative test results for several airfoils and bi-vane airfoil in accordance with one embodiment of my invention;

DESCRIPTION OF THE PREFERRED EMBODIMENTS

Figure 1:
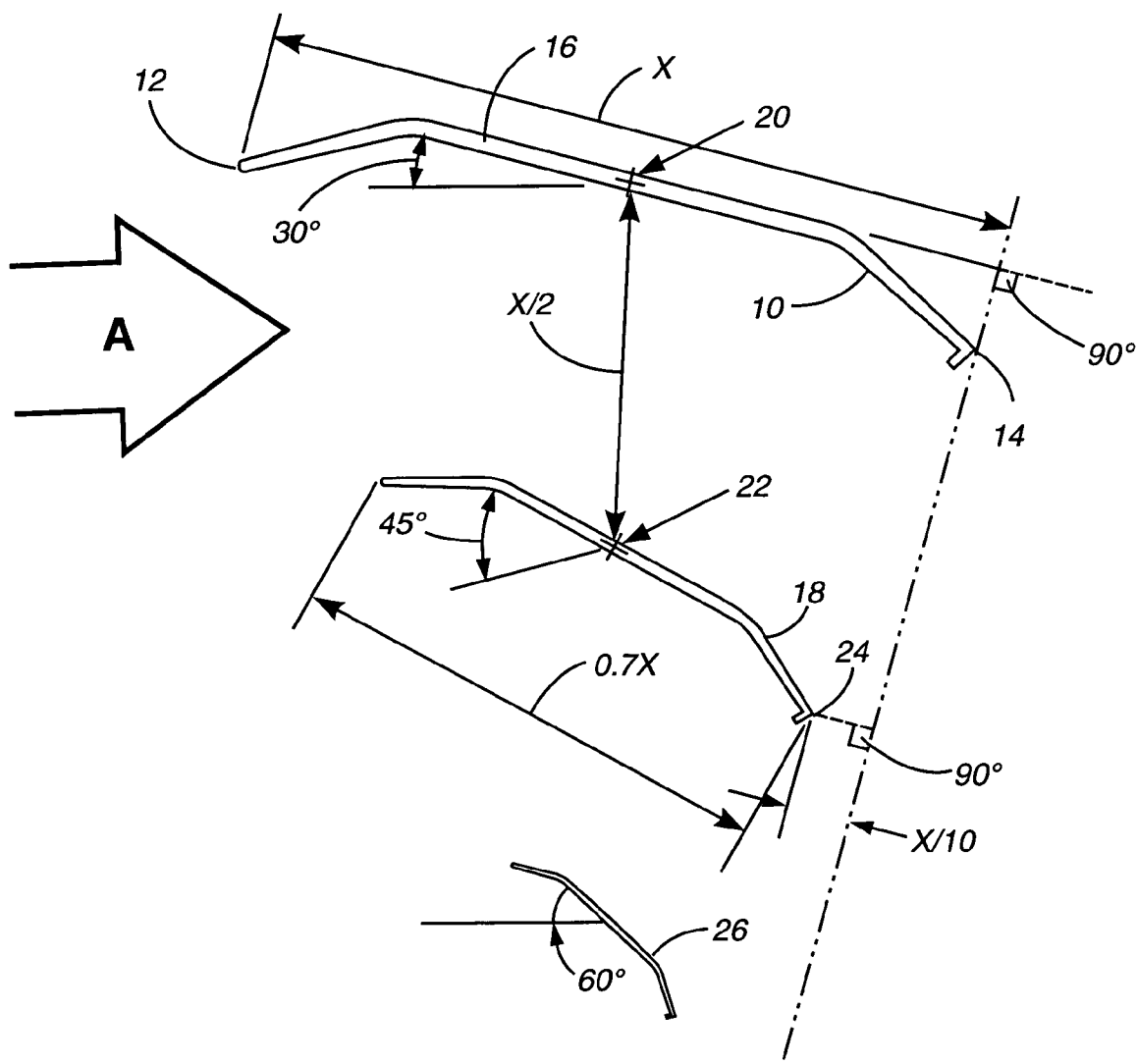
FIG. 1 shows a schematic representation of a plurality of air foils taken in end of view and arranged in a stack.

Referring to FIG. 1, this shows graphically an end view representation of a plurality of air foils or blades positioned with respect to one another and the entry air flow, as shown by the arrow "A". The blades are shown as being predominantly flat, of uniform cross-section and having a lip at the down wind edge (as shown in my prior U.S. patents for air foils and windmill structures such as U.S. Pat. No. 6,132, 181, issued Oct. 17, 2000). The blade 10 has a cord length "X" measured from the leading edge tip 12 to tip 14 on a line parallel to the plane of the central portion 16. Blade 18 is most preferably somewhat smaller in overall length. The blades are positioned with respect to one another such that the center 20 of the central portion 16 of the blade 10 is spaced approximately 50% of the blade cord length "X", that is, X divided by 2, from the center 20 to the center 22 of the central portion of the blade 18.

The lower blade 18 is positioned with respect to the upper blade 10 with a 15 degree increased angle of attack greater than the angle of attack of the upper blade 10.

I discovered that this arrangement provides for more air flow deflected in a downward direction. Tip 24 of the blade 18 is positioned approximately 1/10th of the cord length "X" back from the tip 14 on a line taking perpendicular to the line parallel to the cord length "X"; said line passing through the tip 14 as illustrated in FIG. 1.

The cord length of the blade 18 is approximately 70% of "X".

In an alternate embodiment, a third blade 26 can be positioned if it is dimensioned and positioned with the same ratios as given with respect to blades 10 and 18.

Figure 2:
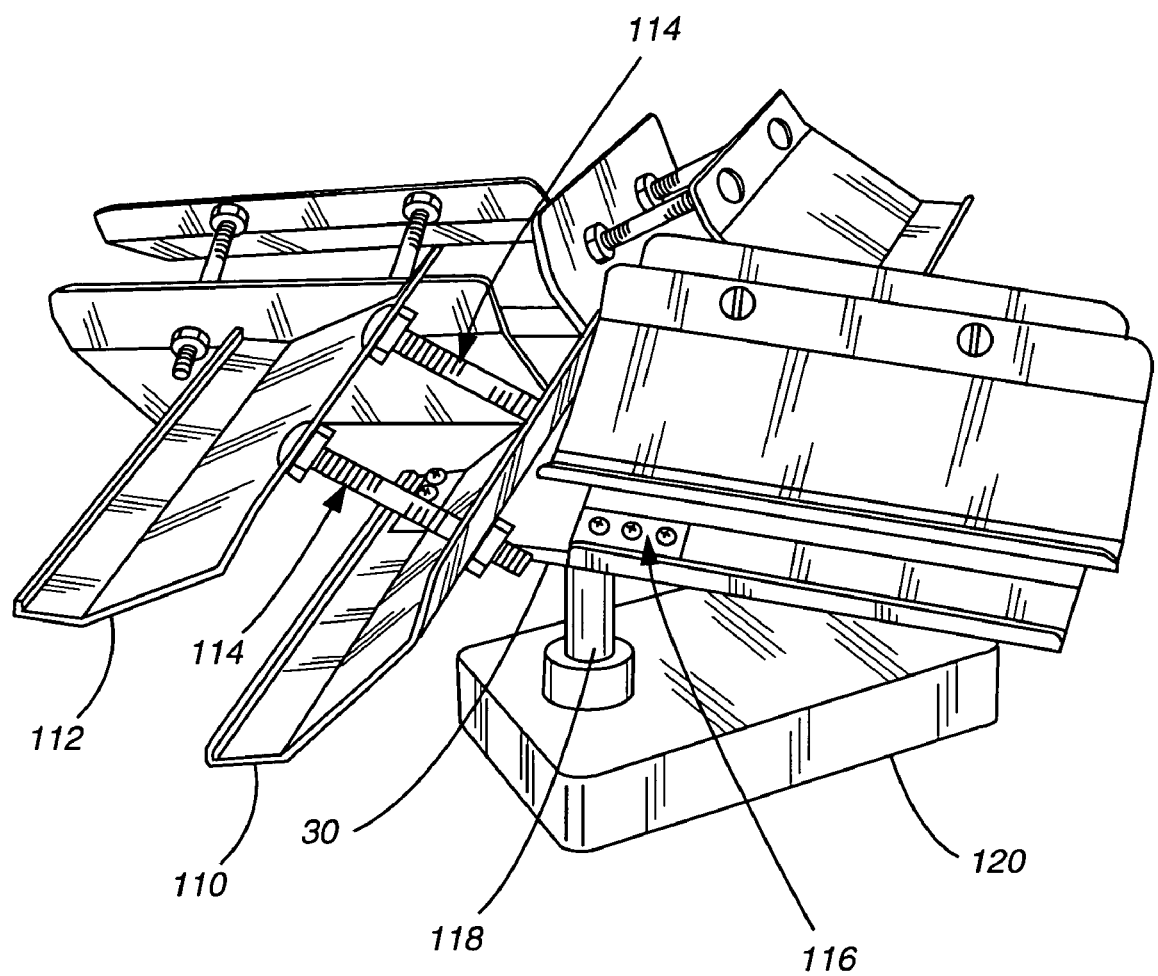
FIG. 2 shows a plurality of blades mounted to the hub of a windmill directly connected to a motor and being arranged in a stack.

FIG. 2 shows how two of these blades 110 and 112 might be held together by stand-offs and bolts designated generally 114 and then mounted to a hub 30 of a windmill by three bolts designated generally 116 fastened through one of the blades. The hub is a plate fixed to the shaft 118 of the windmill; which in turn is connected to the load 120.

Figure 3:
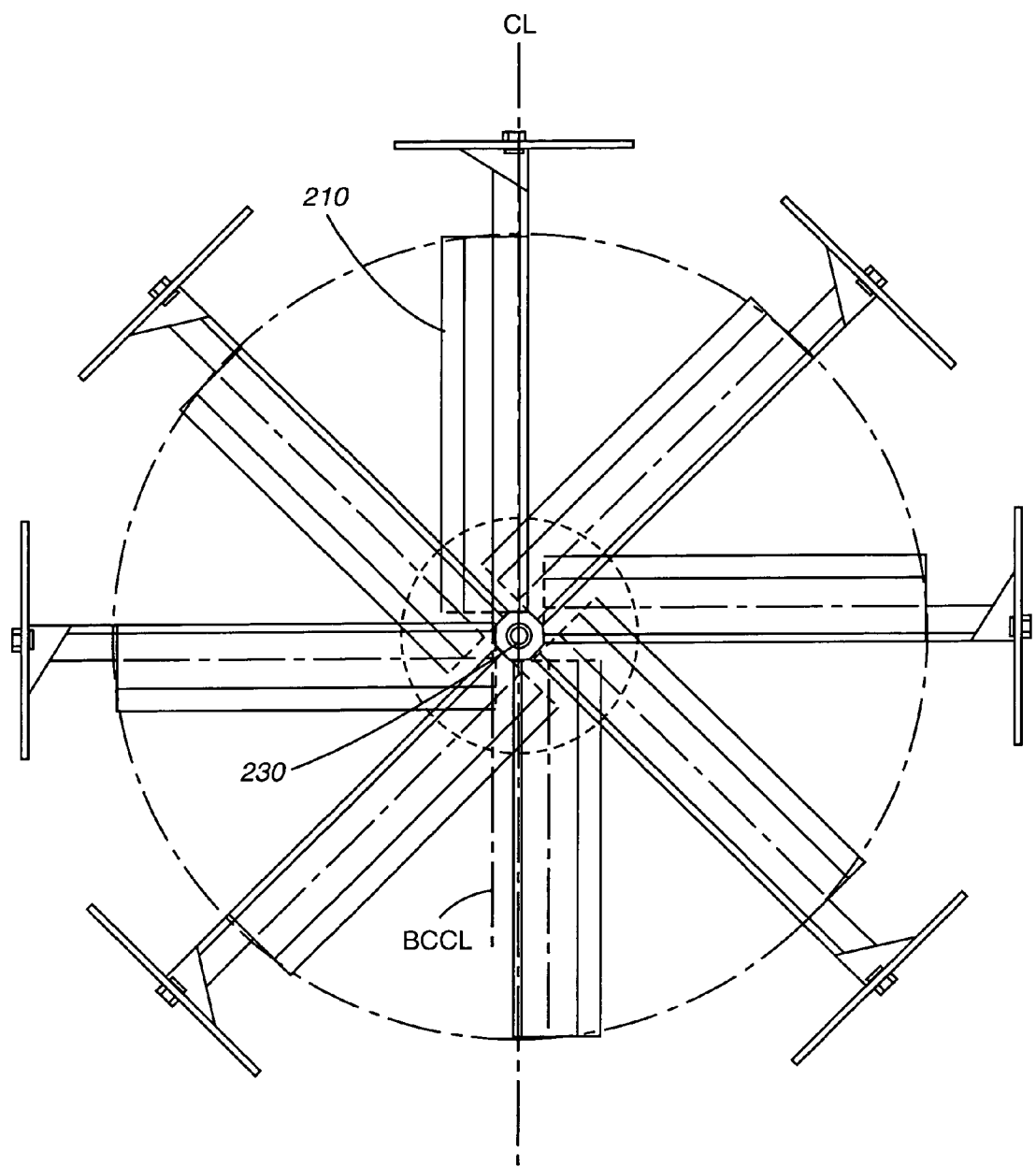
FIG. 3 shows a plurality of blades mounted on a hub.

FIG. 3 shows a preferred method of mounting windmill blades to a hub. In this Figure, the blades 210 are offset from the center, as clearly illustrated by the center line CL of the windmill shaft 230 and the centerline BCCL of the blade chord.

Figure 4:
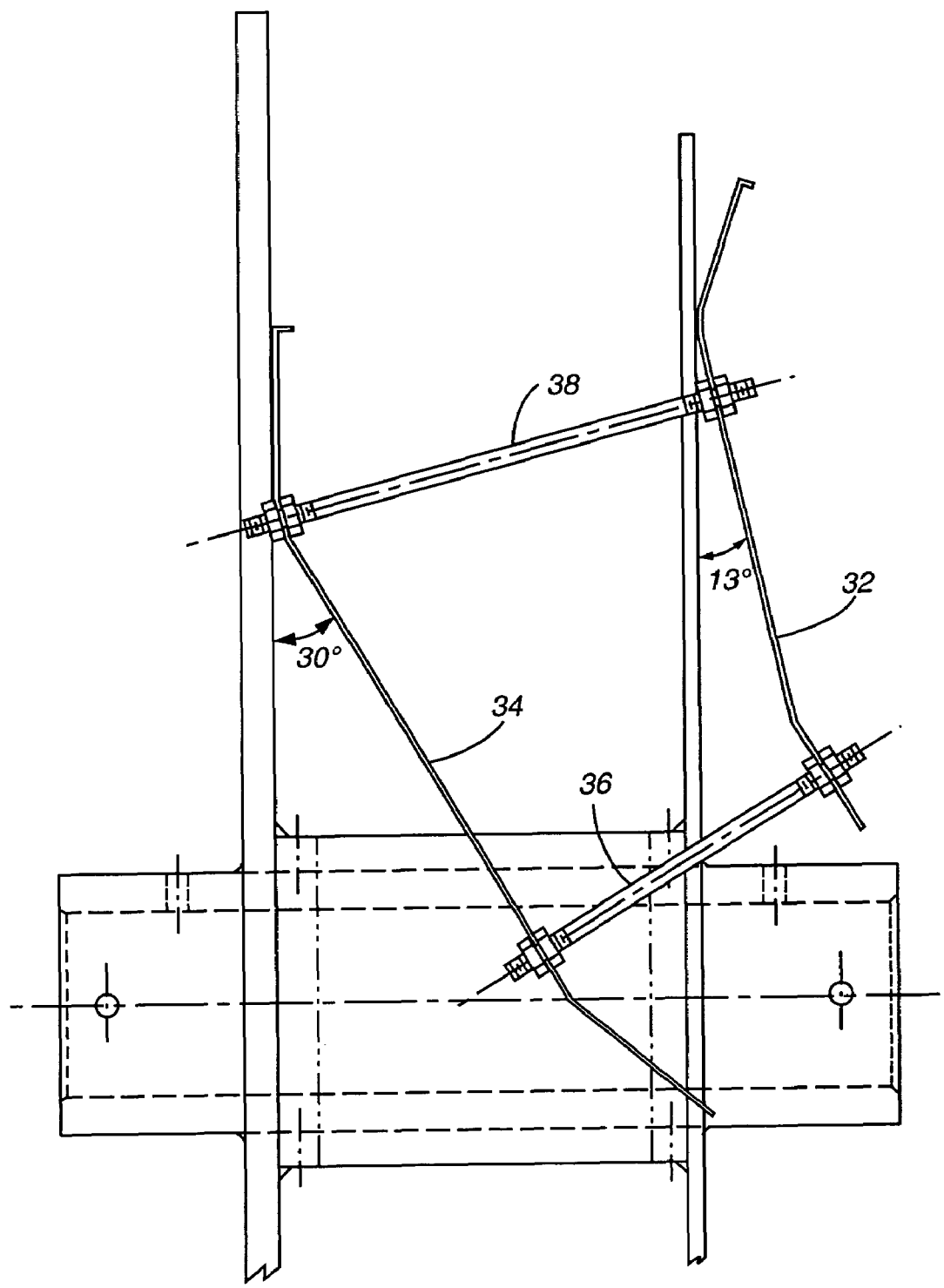
FIG. 4 shows is an end view of a stack of blades connected together and mounted to a hub.
Figure 5:
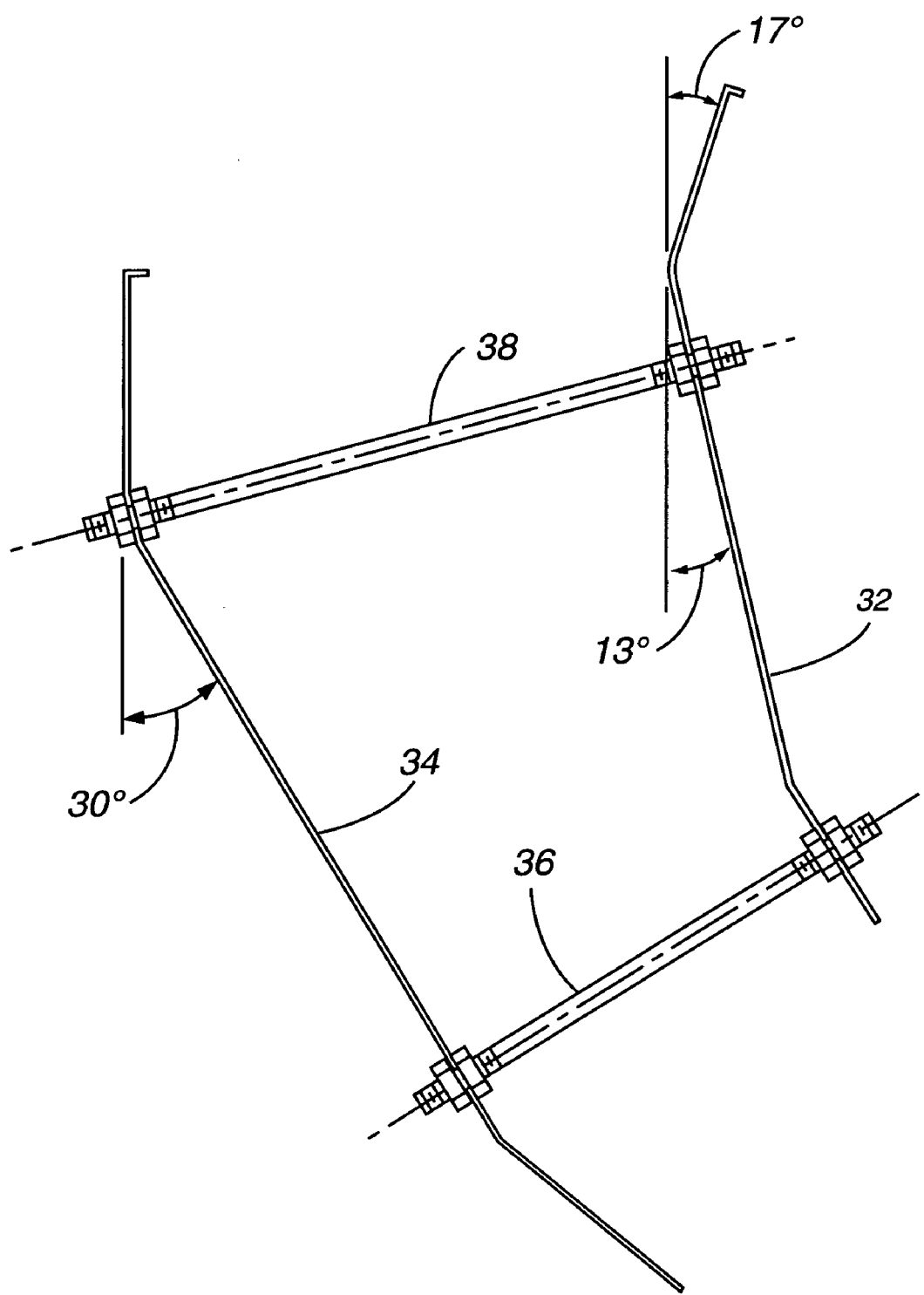
FIG. 5 shows further details of mounting blades, such as those shown in FIG. 4.

FIG. 4 shows the method of mounting the blades with respect to one another and with respect to the hub of a bi-blade windmill. This is an alternate arrangement of blades and specific dimensions provided were used for experimental purposes. Herein the blades 32 and 34 are spaced from one another and held in position by threaded stand-offs 36 and 38. The blades are shown in greater detail in FIG. 5.

Figure 6:
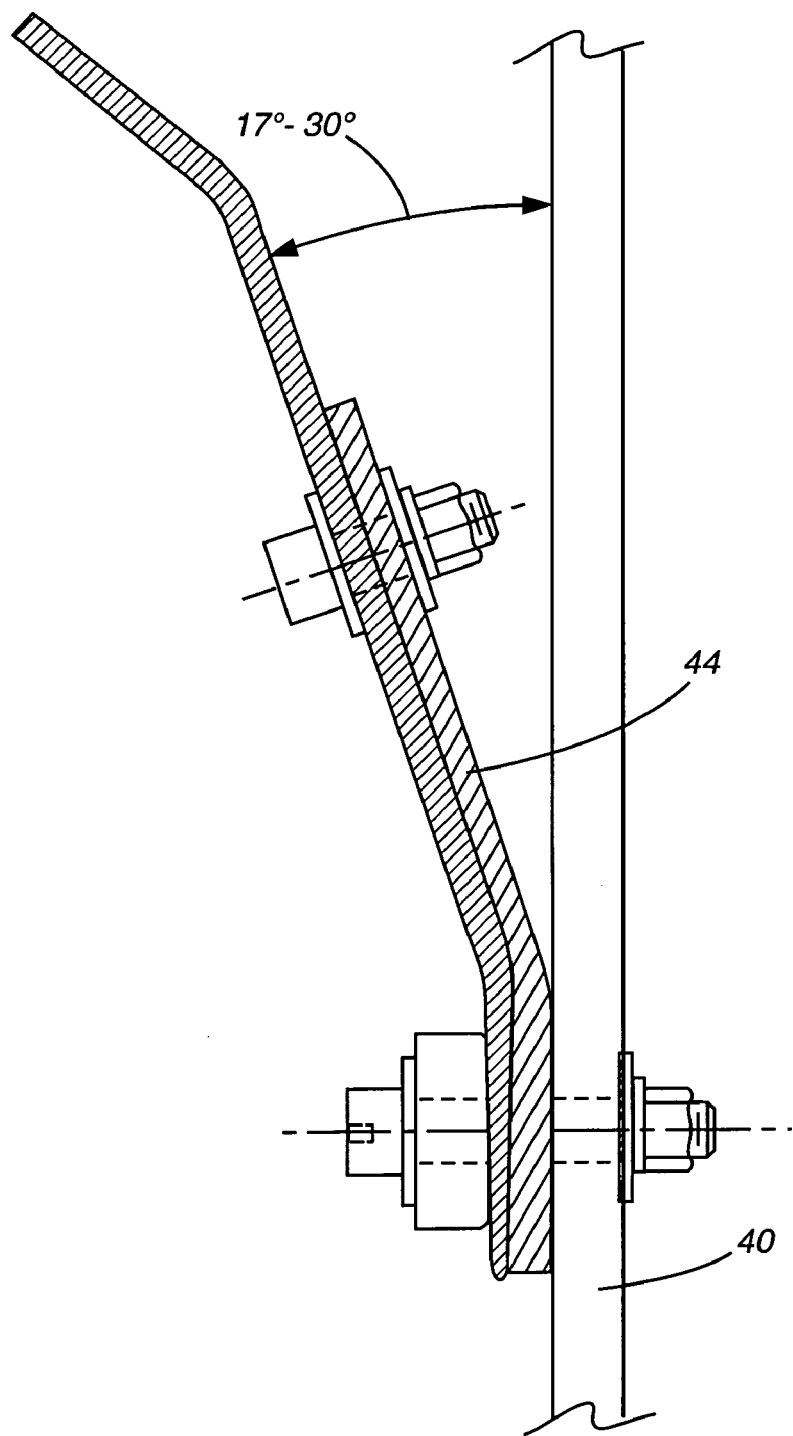
FIG. 6 shows the details of mounting a blade to a hub.
Figure 7:
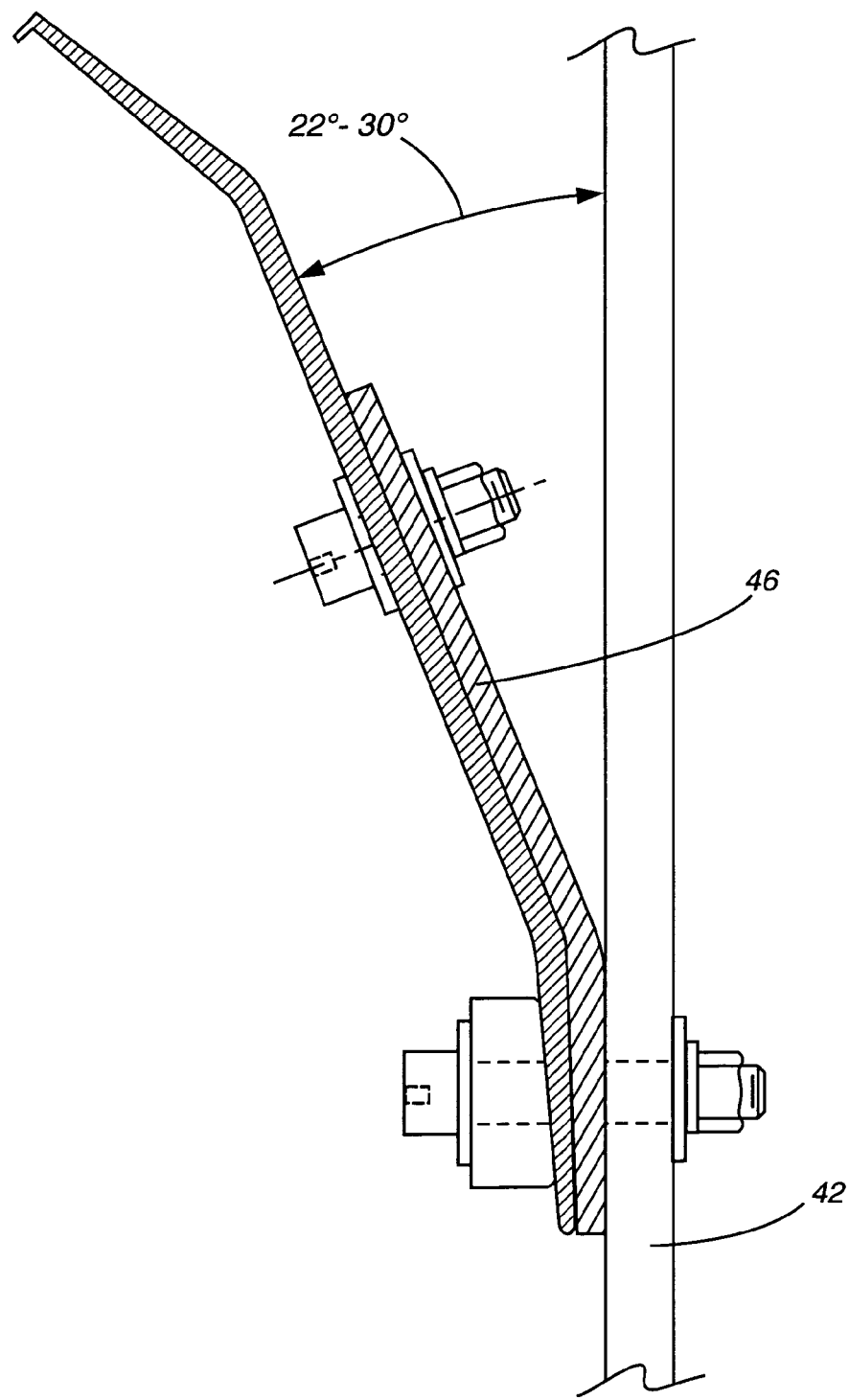
FIG. 7 shows the details of a mounting of a blade to a hub.

FIGS. 6 and 7 show details of the mounting at the ends of the blades to the hub plates 40, 42. In these arrangements, additional braces 44, 46 are provided for the purposes of stiffening.

Additional stiffening arrangements are provided by a plurality of stiffening members 48, FIG. 8. Alternatively, the stiffening members may be staggered, as shown generally at 50 in FIG. 9.

In an alternate embodiment, if one were to mount blades to a hub in an offset fashion, they can be overlapped and canted.

FIG. 10 shows comparative test results for several airfoils and bi-vane airfoil in accordance with one embodiment of my invention.

Figure 11:
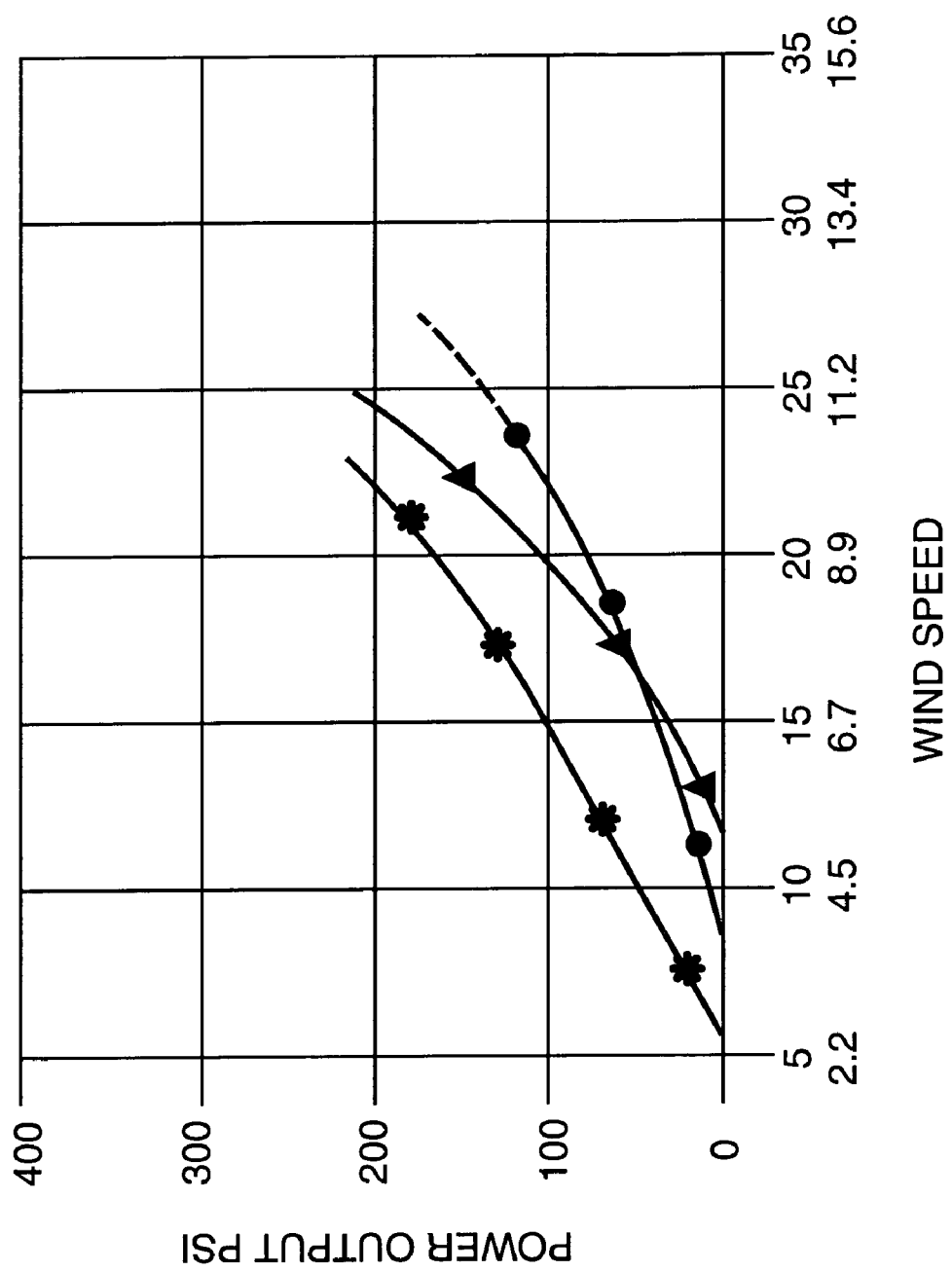
FIG. 11 shows performance curves for a windmill air compressor in accordance with one embodiment of my invention.

FIG. 11 shows performance curves for a windmill air compressor in accordance with one embodiment of my invention.

Figure 12:
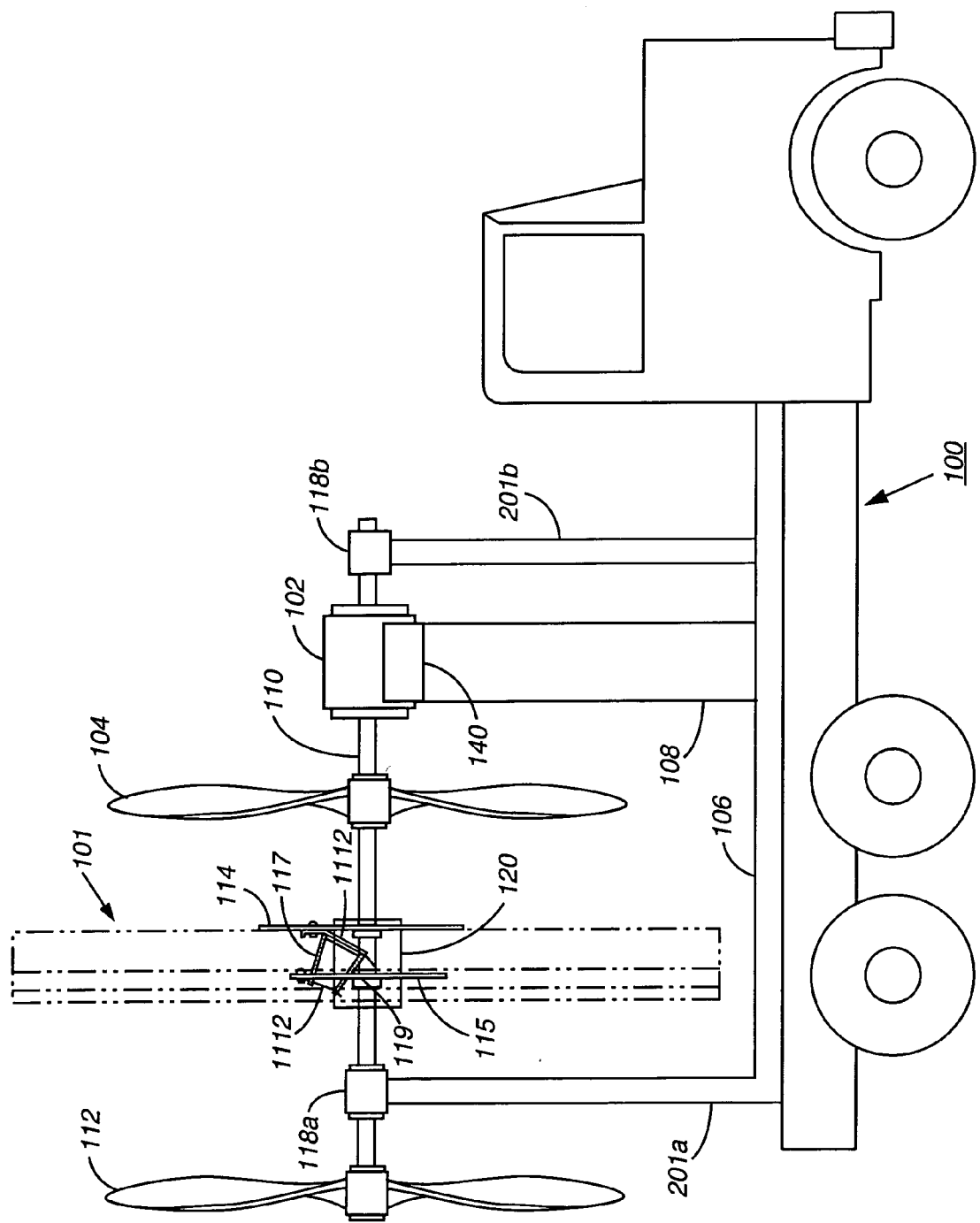
FIG. 12 is a schematic side view of the vehicle in accordance with one embodiment of my invention.

FIG. 12 shows schematically a vehicle designated generally 100, such as, for example, a truck or car, which is propelled by an apparatus comprised of an engine, shown schematically at 102, in combination with a propeller, shown schematically at 104. The engine is fixedly attached to the frame 106 of the vehicle 100 in any suitable way, such as by means of the support structure 108. The device is designed such that when the engine is operating, it rotates the shaft 110 which in turn rotates the propeller 104, causing thrust to drive or propel the vehicle. Outboard of the engine and propeller apparatus, I have provided a windmill system apparatus which comprises a windmill designated generally 101 having a plurality of blades 1112 mounted to a hubs 114 and 115 connected to the shaft 110 (preferably through a clutch means 102) which is journaled in bearings 118a and 118b mounted on beams 201a and 201b which are rigidly connected to the frame 106 supporting the entire structure.

A plurality of air foils or blades 1112 are positioned radially with respect to one another. Each of the blades shown are predominantly flat, of uniform cross-section and have a lip at the downwind edge (as shown in my prior U.S. patents for air foils and windmill structures such as U.S. Pat. No. 6,132,181, issued Oct. 17, 2000). The blades are positioned with respect to one another such that the center of the central portion of one blade is spaced approximately 50% of the blade cord length from the center to the center of the central portion of the other blade.

I discovered that this arrangement provides for more air flow deflected in a downward direction.

In this arrangement, additional braces 117 and 119 may be provided for the purposes of stiffening.

A plurality of such blade arrangements are provided spaced radially from one another.

The outboard end of the shaft 110 may be connected for rotation to an additional propeller 112 to provide further thrust.

The windmill 101 engages the shaft 110 through a clutch means 102, which functions as follows: as long as the windmill is slower than the shaft 110 being driven by the propeller 104, it overrides the windmill and allows the propeller to turn without engaging the windmill. When the windmill 101 goes faster than the shaft 110, the clutch engages and the windmill assists in driving the power transfer means, that is, the shaft 110. A second clutch 140 disengages the source of power, that is, the motor and overrides it when there is enough power supplied by the windmill for vehicle propulsion, that is, the motor power source is cut off.

Once the aerodynamic lift of the windmill is input into the system, it is theorized that the system is getting energy from atmospheric pressure due to gravity.

Figure 13:
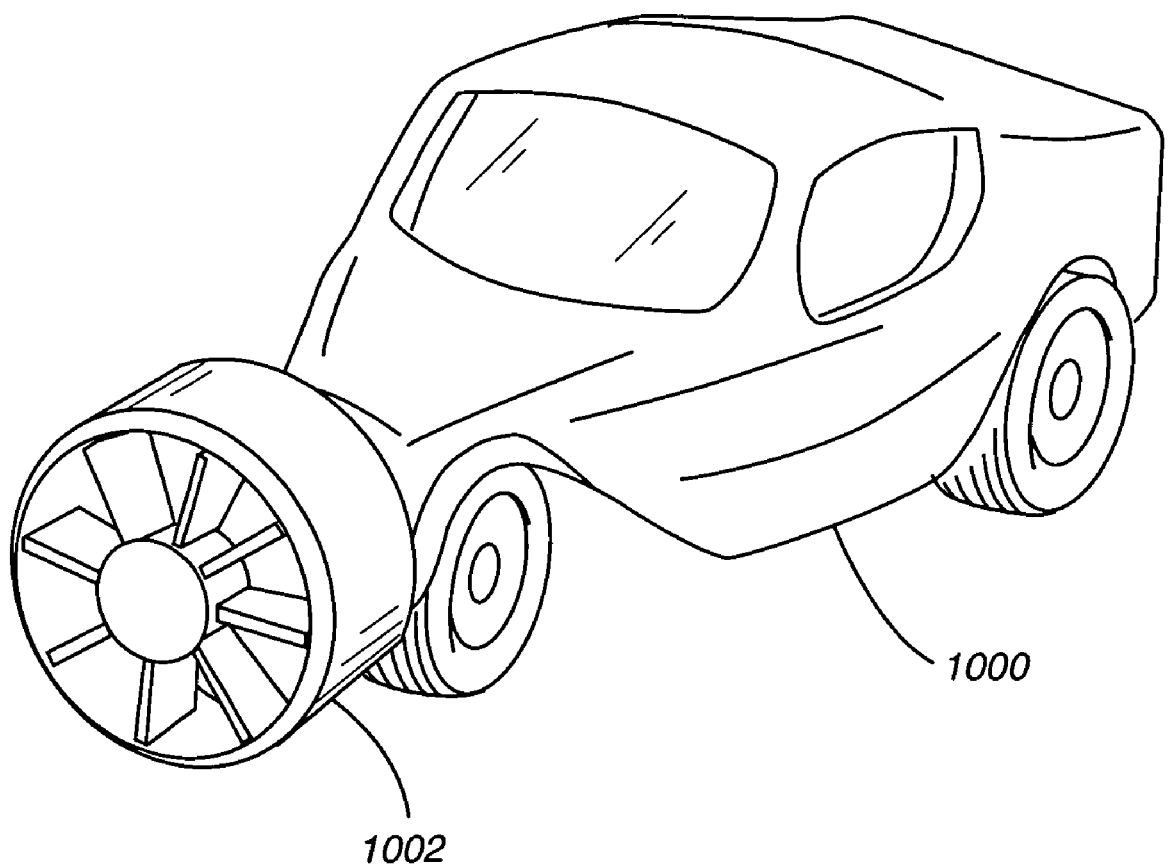
FIG. 13 is a schematic side view of the vehicle in accordance with one embodiment of my invention.
Figure 14:
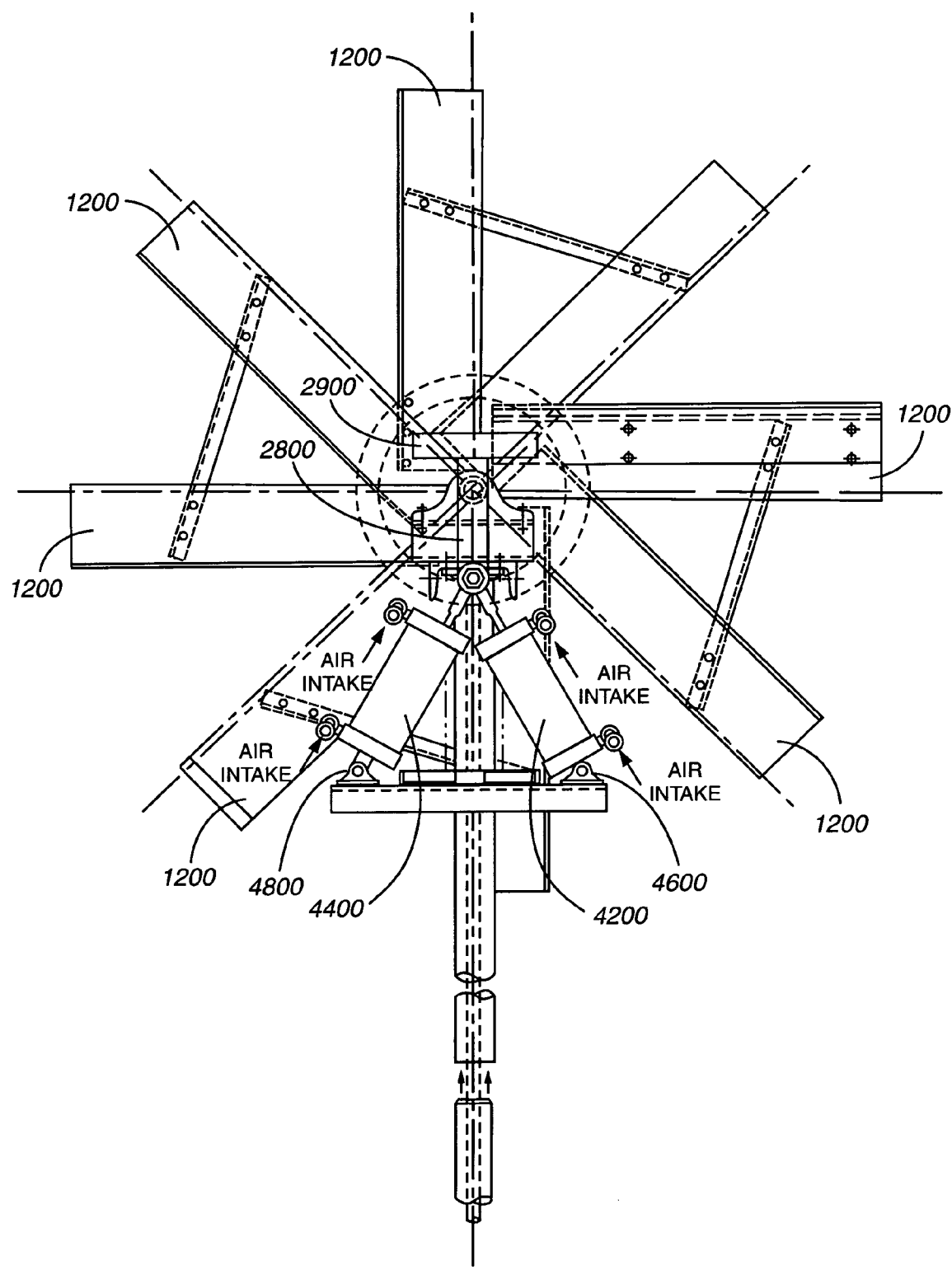
FIG. 14 is a rear view of a windmill system.

It is also theorized that the optimum vehicle speed will be between 30 and 45 mph depending on the efficiency of the airfoil design in the windmill. The power available from the windmill ultimately exceeds the power required to move the vehicle. Prior to that speed, the windmill assists in powering the vehicle. This embodiment of my invention is further illustrated in FIG. 13 which shows a three wheel vehicle 1000. The windmill 1002 is geared up to apply continuous farce as the speed of the vehicle increases. This must be a calculated ratio as to windmill power profile (speed) to tire size.

Herein, an engine to wheel clutch is needed, but a windmill clutch drive is not necessary. As vehicle speed increases, the engine powers the vehicle with increasing windmill assist up to the power required and power available solely from the windmill. The intersect speed is perhaps in the 40 to 60 mph range. At that point, the windmill runs the vehicle.

Windmill placement in front of the vehicle causes some vehicle drag shading by work extraction, slowing air flow just forward of the vehicle. Vehicle drag is intercepted to do windmill work. Enhancement is provided in that aerodynamic power via windmill has an eight times power increase available from wind vehicle speed increases. Drag has a lower exponential increase from work derived from aerodynamic lift (rotational torque) provided from windmill blades.

In the most preferred embodiment, I use multiple airfoils as shown in this and my prior applications noted above.

In a further embodiment of my invention, the additional propeller 112 is used to propel the vehicle.

This device draws power from atmospheric pressure and/or motion by gravity and wind and vehicle motion done by ordinary means to assist and ultimately take over vehicle propulsion driving power. It employs a windmill as supplementary drive power to a gas, electric, diesel or compressed air, or the like, source of primary power. This inputs partial and perhaps full takeover of the drive power after reaching the speed that makes possible over 100% of the propulsion power requirement.

In its optimum condition, the windmill power input may reach self-sustaining drive power. That is, it could provide all of the power input necessary to propel the vehicle.

It is theorized that the basis for this aerodynamic lift comes from gravity as an amplification of various inertial bases. Therefore, there is in some speed range less drag in making power than in using power.

Referring to FIGS. 14-16, and 18 they show a windmill system apparatus which comprises a windmill designated generally 1000 having a plurality of blades 1200, 1202 and 1204 mounted to plates 1400, 1500 and 1550 connected to a hub 1575 connected to a shaft 1600 which is journaled in bearings 1800 mounted on a horizontal beam 2000 which is rigidly connected to a vertical tube 2200 and a base 2400 supporting the entire structure.

Figure 15:
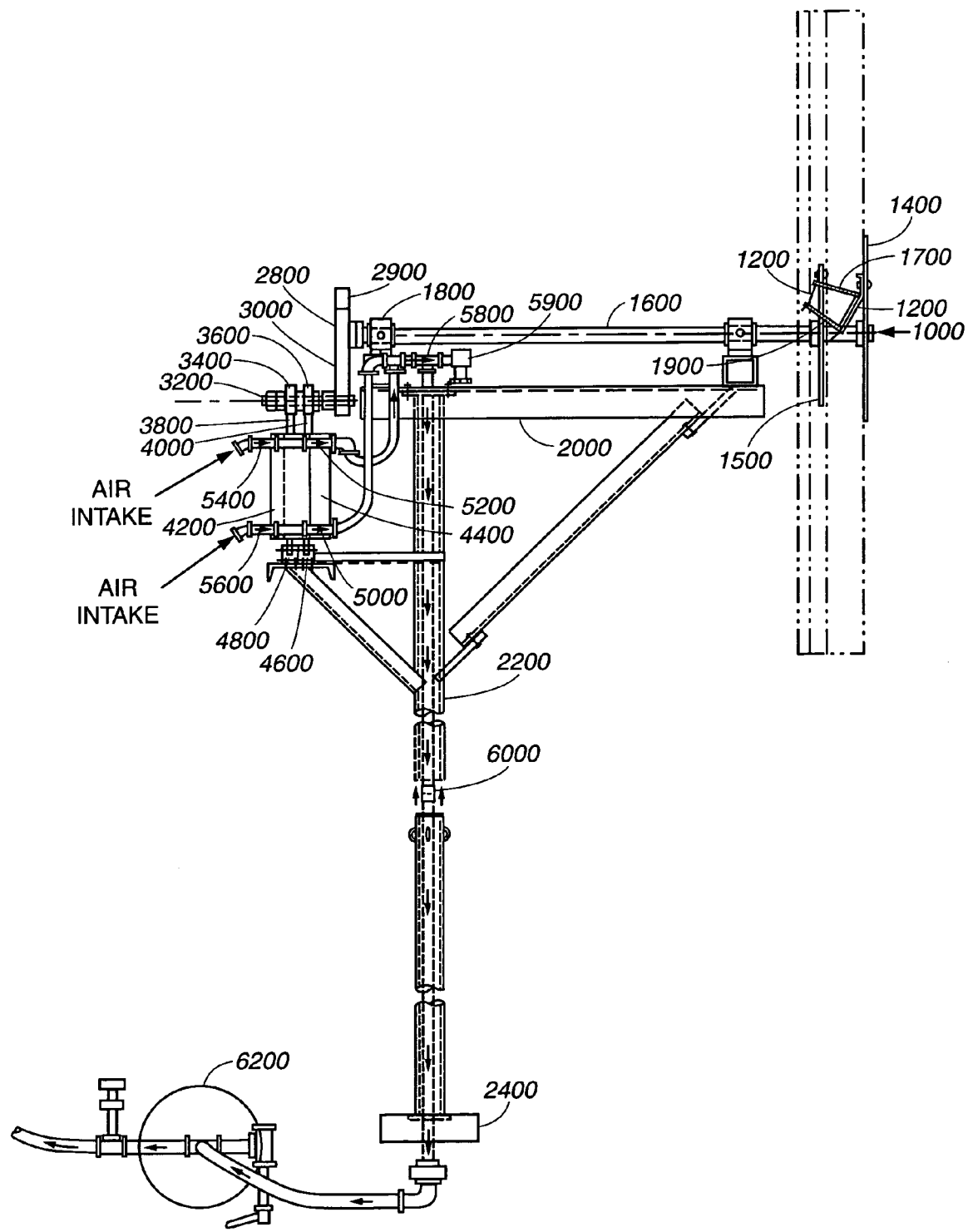
FIG. 15 is a side view of the windmill system shown in FIG. 14.

Referring to FIG. 15, this shows a side view of a plurality of air foils or blades 1200 positioned with respect to one another. The blades are shown as being predominantly flat, of uniform cross-section and having a lip at the down wind edge (as shown in my prior U.S. patents for air foils and windmill structures such as U.S. Pat. No. 6,132,181, issued Oct. 17, 2000). The blades are positioned with respect to one another such that the center of the central portion of one blade is spaced approximately 50% of the blade cord length from the center to the center of the central portion of the other blade.

I discovered that this arrangement provides for more air flow deflected in a downward direction.

FIG. 15 shows the mounting at the ends of the blades to the hub plates 1400 and 1500. In this arrangement, additional braces 1700 and 1900 may be provided for the purposes of stiffening.

Figure 17:
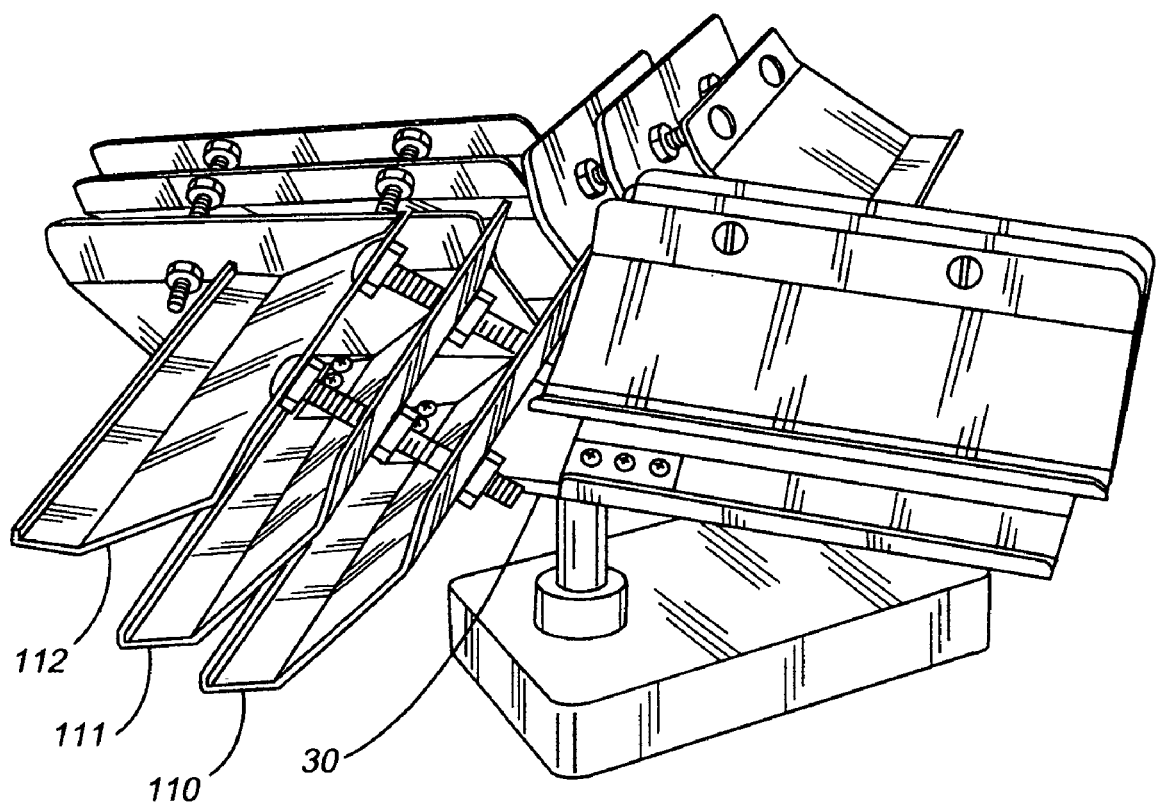
FIG. 17 is a view similar to FIG. 2 showing multiple sets of three blades mounted on a single hub.
Figure 18:
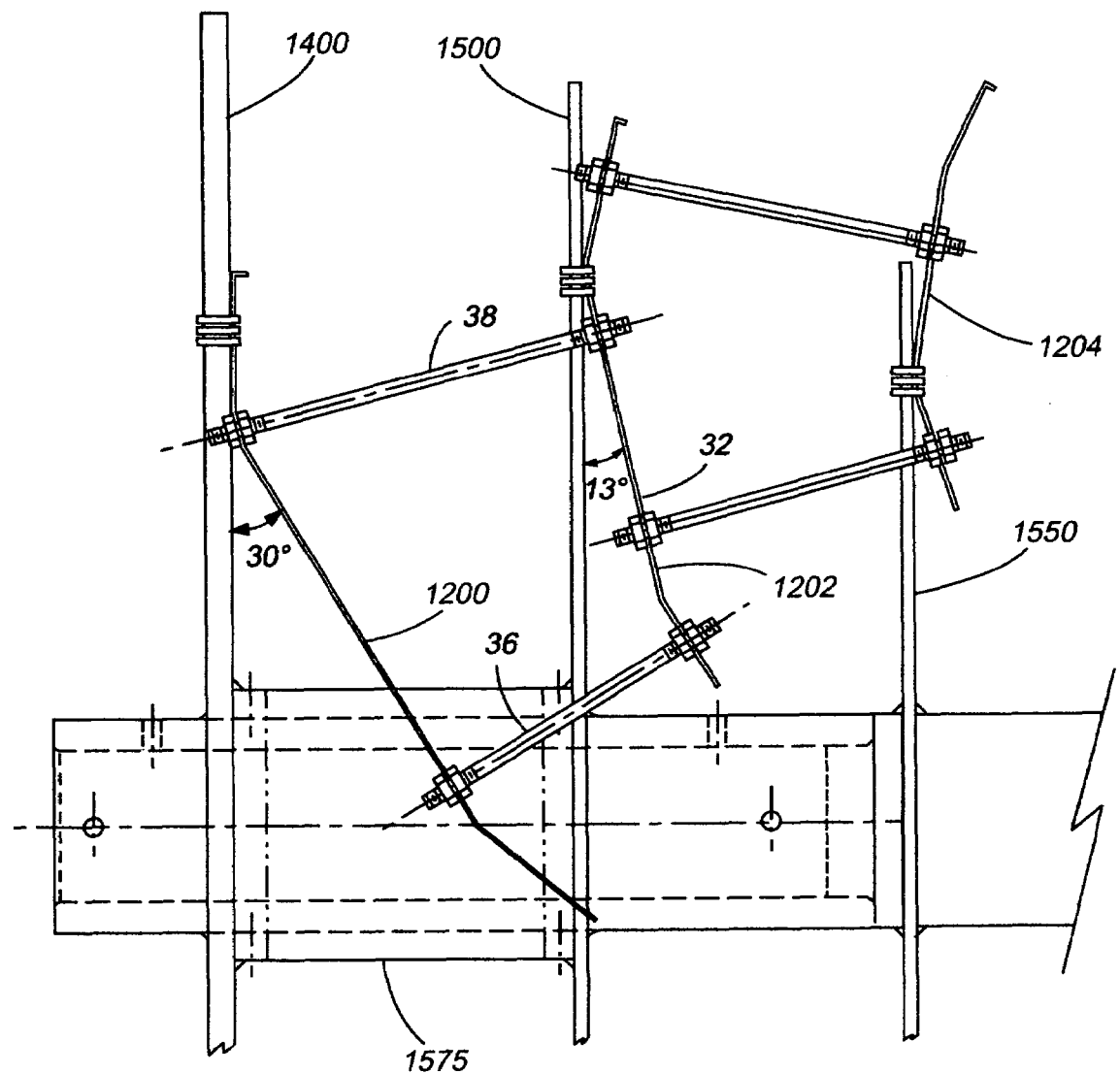
FIG. 18 is an enlarged view of a modified portion of FIG. 15 showing a set of three blades mounted on a single hub as part of a windmill apparatus.

See for example FIG. 17 which shows multiple sets of three blades 110, 111 and 112 mounted to a single hub 30.

A plurality of such blade arrangements are provided spaced radially from one another.

The outboard end of the shaft 1600 is connected for rotation to a crank arm 2800. One end 2900 of the crank arm 2800 is "T" shaped and is used to counterbalance the stroke of the pistons in the piston/cylinders 4200, 4400. The other end 3000 of the crank arm has a shaft 3200 extending therefrom which supports bearings 3400 and 3600. Mounting means disposed about these bearings support and are connected respectively to the piston shafts 3800 and 4000 of the dual acting piston/cylinders 4200 and 4400, respectively. The other ends of the air cylinders are mounted to be pivoted on bases 4600 and 4800, respectively.

In operation, as the windmill rotates, it turns the shaft 16 which, in turn, rotates the crank arm 2800. Since the shafts 3800 and 4000 of the pistons are journaled to the shaft 3200, as the crank arm rotates, it drives the pistons in and out of their respective cylinders. One of these cylinders of the piston/cylinder 4400 is of a greater diameter than the other, 4200. Both of the cylinders are double acting and both have the same stroke length on rotation of the crank arm. However, they are spaced radially so as to sequence top and bottom dead center points (by approximately 30 degrees), thereby distributing the loading over a longer duration of rotation and reducing the maximum force needed for a given pounds per square inch/cubic feet per minute rate.

Referring to the Figures, they show the air exchange system using these two piston/cylinders.

Figure 16:
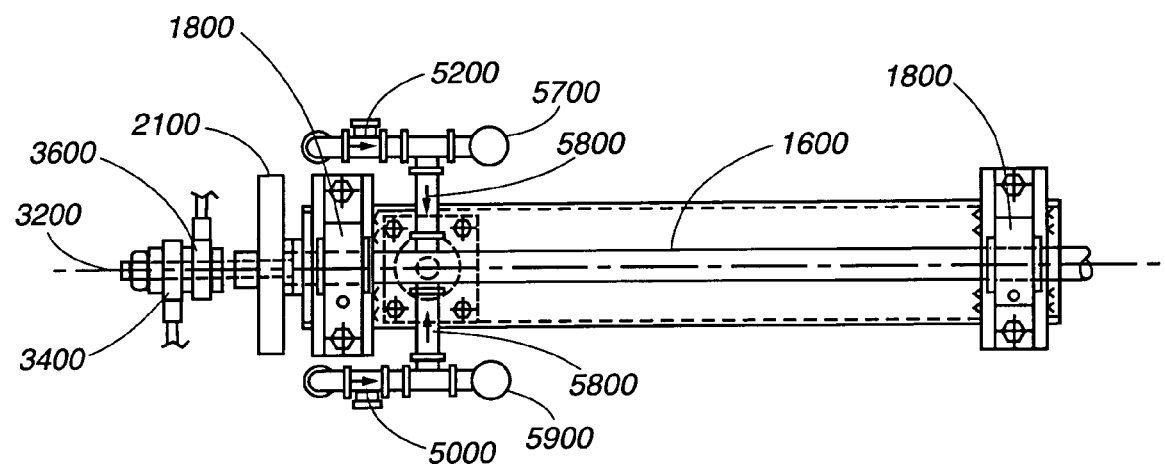
FIG. 16 is a top view of a portion of the windmill system shown in FIG. 15.

Since there are check valves at each end of the cylinders, each cylinder is double acting in that on the withdrawal stroke of the piston shafts 3800, 4000, compressed air is forced out of the upper end of the cylinders of the piston/cylinders 4200, 4400 in FIG. 16; and on the down stroke, compressed air is forced out of the lower end of the cylinders. There are check valves 5000, 5200, FIG. 15, at both ends to keep the air from flowing back in once it has been exhausted from the cylinder. There are also check valves 5400, 5600, FIG. 15, at the air intake to keep the air from flowing out once it has been drawn into the cylinder. Down stream of the exhaust check valves, such as 5000 and 5200, there are adjustment relief valves 5700, 5900 which will be discussed more fully hereinafter. Also, downstream of the check valves are check valves 5800; to keep air from flowing back into the system. Downstream from that valve 5800, there is a hose or piping 6000 to the compressed air reservoir tank 6200. The same piping system is provided for both cylinders.

System Operation

In operation, the pressure relief valves 5700, 5900 are set at predetermined pressures. For example, for the bigger diameter cylinder 4400; relief valve 5700 might be set at 55 or 60 pounds per square inch. For the smaller diameter cylinder, pressure relief valve 5900 might be set at approximately 86 pounds per square inch pressure. Thus, after the pressure reaches 55 psi, the valve 5700 simply exhausts its compressed air. Therefore, the windmill does not have to push against the combined forces of the bigger and smaller piston/cylinders. Once that pressure is reached, the smaller piston/cylinder nevertheless keeps working and keeps compressing air up to its limit of approximately 86 pounds.

The smaller cylinder is designed to work with winds of approximately 6 to 10 mph. Once the volume is reached in the tank 6200 and the lower pressure limit is reached, the bigger diameter cylinder drops out of the production of compressed air, so that at least something is gained from the windmill system. Otherwise, the windmill would stall because it cannot drive both pistons at low speeds. Thus, this arrangement extends the range of useful work that the windmill can perform.

Note that when no pressure is in the tank 6200 and the windmill first starts up, both cylinders pump compressed air into the storage tank as pressure in the tank climbs to the preset pressure of the larger cylinder.

What is claimed is:

1. A windmill apparatus comprising:
windmill means mounted to a windmill shaft to rotate said shaft in response to air flow through said windmill means; the windmill means comprising multiple sets of three windmill blades, said blades in a set being attached to one another and mounted to a single hub, wherein the blades of each set of windmill blades are predominantly flat, of uniform cross-section, have a central portion ending in tips, and have a lip at one tip; the blades in a set further comprise a first blade that has a cord length "X" measured from tip to tip on a line parallel to the plane of the central portion; a second blade somewhat smaller in overall length than the first blade; and a third blade somewhat smaller in overall length than the second blade; the blades are positioned with respect to one another such that the center of the central portion of the first blade is spaced approximately 50% of the blade cord length "X" from the center to the center of the central portion of the second blade; and the second blade is positioned with respect to the third blade such that the center of the central portion of the second blade is spaced approximately 50% of the second blade's cord length from the center to the center of the central portion of the third blade; the second blade is positioned with respect to the first blade with a 15 degree increased angle of attack greater than the angle of attack of the first blade to the direction of wind through the windmill; a tip of the second blade is positioned approximately 1/10th of the cord length "X" back from a tip on the first blade on a line taken perpendicular to the line parallel to the cord length "X"; said line passing through said tip on said first blade; the cord length of the second blade is approximately 70% of "X" and the third blade is dimensioned and positioned with respect to the second blade, with the same ratios as given with respect to the first and second blades.

* * * * *